United States Patent [19]

Boyles et al.

[11] 4,120,675
[45] Oct. 17, 1978

[54] AIR CLEANER

[75] Inventors: Tonnie M. Boyles; Hubert E. Hunter, both of Louisville, Miss.

[73] Assignee: Taylor Machine Works, Inc., Louisville, Miss.

[21] Appl. No.: 842,967

[22] Filed: Oct. 17, 1977

[51] Int. Cl.² .................................. B01D 45/18
[52] U.S. Cl. ........................... 55/431; 188/2 R
[58] Field of Search .................. 180/54 A, 64 A; 188/1 R, 2 R; 52/302; 55/36, 306, 324, 337, 334, 346, 428–432, 442, 443, 456, 466

[56] References Cited

U.S. PATENT DOCUMENTS

| | | | |
|---|---|---|---|
| 1,591,677 | 7/1926 | Garner | 55/431 |
| 1,745,950 | 2/1930 | Orem | 55/334 |
| 1,919,343 | 7/1933 | Payne | 188/1 R X |
| 2,091,865 | 8/1937 | Leveen | 188/2 R |
| 2,155,869 | 4/1939 | Pearson | 188/2 R X |
| 2,352,385 | 6/1944 | Hollerith | 188/2 R |
| 2,737,261 | 3/1956 | Duncan et al. | 55/466 X |
| 3,030,755 | 4/1962 | Farr et al. | 55/456 |
| 3,071,915 | 1/1963 | Hardy | 55/324 |
| 3,104,962 | 9/1963 | Duer | 55/431 X |
| 3,165,390 | 1/1965 | Parken et al. | 55/431 |
| 3,190,058 | 6/1965 | Farr et al. | 55/442 X |
| 3,212,240 | 10/1965 | Streete | 55/346 |
| 3,237,386 | 3/1966 | Farr et al. | 55/466 X |
| 3,369,349 | 2/1968 | Farr | 55/442 |
| 3,378,994 | 4/1968 | Farr | 55/324 |
| 3,385,034 | 5/1968 | Farr | 55/337 |
| 3,385,037 | 5/1968 | Farr et al. | 55/443 |
| 3,435,503 | 4/1969 | Farr | 52/302 X |
| 3,447,966 | 6/1969 | Manno | 188/1 R X |
| 3,521,431 | 7/1970 | Connors et al. | 55/306 |
| 3,708,957 | 1/1973 | Labadie | 55/36 |

Primary Examiner—Richard L. Chiesa

[57] ABSTRACT

The dust collecting bin of an air cleaner system of the type including a centrifugal-type separator for separating dust from air is coupled to the exhaust port of a pressurized air brake system so that any dust collected in the bin will be blown therefrom by any pressurized air exhausted from the brake system.

10 Claims, 2 Drawing Figures

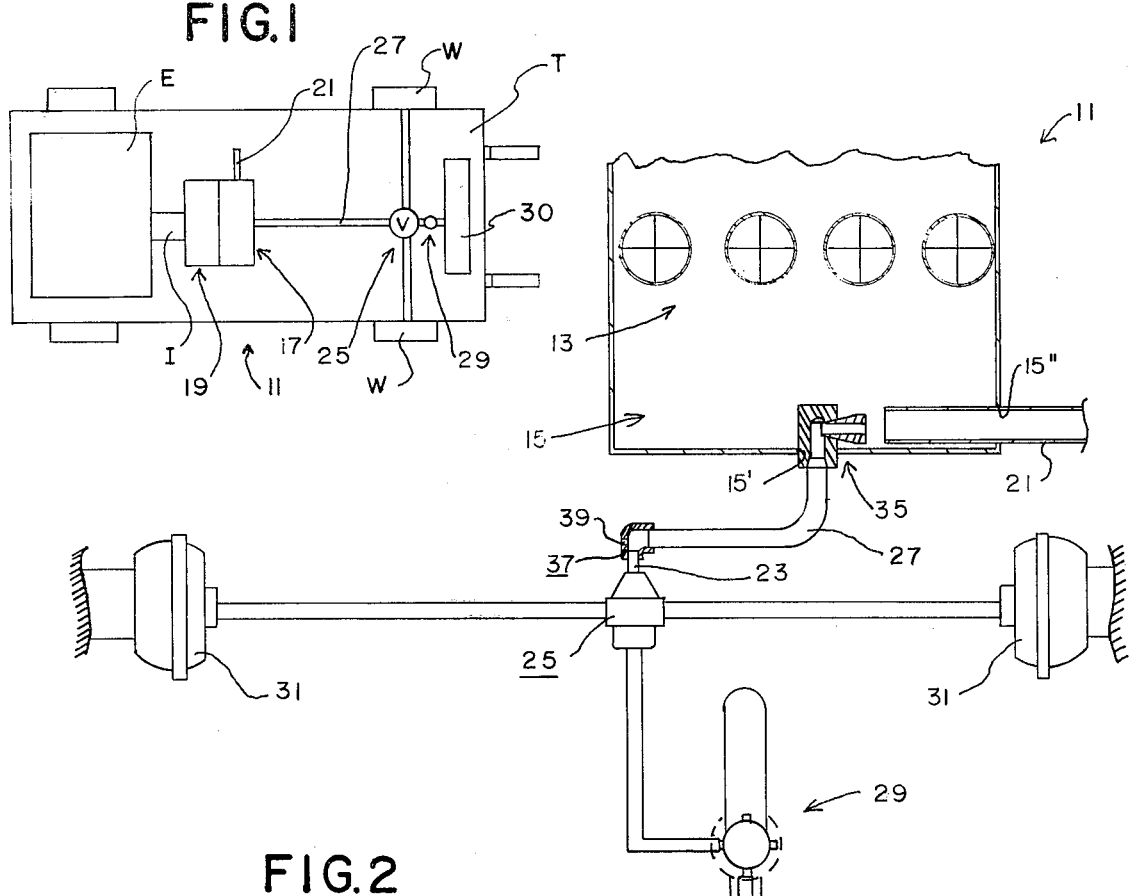
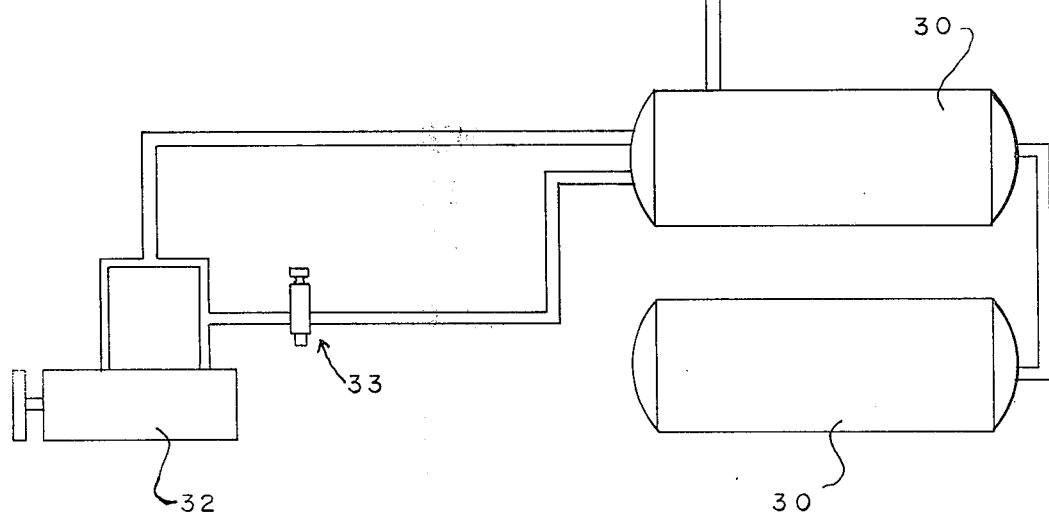

AIR CLEANER

BACKGROUND OF THE INVENTION

1. Field of the Invention

This invention relates generally to self-cleaning type air cleaners and more specifically to such air cleaners which include a separator means for separating particulate material from air and include a bin for receiving and collecting any particulate material thus separated.

2. Description of the Prior Art

Heretofore, various self-cleaning type air cleaners have been developed. See, for example, Garner, U.S. Pat. No. 1,591,677; Orem, U.S. Pat. No. 1,745,950; Duncan, U.S. Pat. No. 2,737,261; Farr, U.S. Pat. No. 3,030,755; Hardy, U.S. Pat. No. 3,071,915; Parken, U.S. Pat. No. 3,165,390; Streete, U.S. Pat. No. 3,212,240; Farr, U.S. Pat. Nos. 3,190,058; 3,237,386; 3,369,349; 3,378,994; 3,385,034; 3,385,037; and 3,435,503; Connors, U.S. Pat. No. 3,521,431; and Labadie, U.S. Pat. No. 3,708,957. None of the above patents disclose or suggest the present invention.

The dust bins of air cleaners of the type including separator means for separating dust or the like from air passing therethrough have heretofore been cleaned by suction being applied thereto to draw any dust or the like therefrom (see, e.g., Hardy, U.S. Pat. No. 3,071,915). Additionally, Farr Company of El Segundo, California has heretofore developed an air cleaner of the above type which utilized positive pressure in the form of compressed air from the intake manifold of a turbocharged engine or from the air box of a normally aspirated engine to blow any dust or the like contained in the dust bin therefrom.

SUMMARY OF THE INVENTION

The present invention is directed towards overcoming the problems and disadvantages of prior air cleaners. The present invention involves an air cleaner system of the type including a separator means for separating particulate material from air before the air passes into the air intake of an internal combustion engine and including a bin for receiving and containing any particulate material so separated. The concept of the present invention is to couple the exhaust port of a pressurized air brake system to the bin to allow the pressurized air expelled from the brake system when the brake system is activated and subsequently deactivated to pass through the bin and expel any particulate material contained within the bin therefrom.

BRIEF DESCRIPTION OF THE DRAWINGS

FIG. 1 is a diagrammatic top plan view of a lift truck including the air cleaner of the present invention.

FIG. 2 is a somewhat detailed diagrammatic view of the air cleaner of the present invention.

DESCRIPTION OF THE PREFERRED EMBODIMENT

The air cleaner 11 of the present invention is for use with an internal combustion engine E (FIG. 1) to filter air before that air is drawn into the air intake as at I (FIG. 1) of the engine E. The air cleaner 11 is of the type which includes a separator means 13 for separating particulate material from air before the air passes into the air intake I of the internal combustion engine E and includes a bin 15 for receiving and containing any particulate material so separated (see FIG. 2). The separator means 13 is preferably of the centrifugal type well known to those skilled in the art. The air cleaner 11 is preferably a two-stage filter with the separator means 13 and bin 15 forming the first stage as at 17 (FIG. 1) and with a fiber filter or the like forming the second stage as at 19 (FIG. 1). The first stage 17 is mainly used to remove dust from the air passing therethrough and the bin 15 is commonly referred to by those skilled in the art as a dust bin. A dust outlet such as the pipe 21 or the like is communicated with the bin 15 to allow any dust or other particulate material contained in the bin 15 to be removed from the bin 15 therethrough. The pipe 21 allows the dust or the like to be exhausted into the atmosphere. Heretofore, the dust or the like has been removed from the bin 15 either by negative pressure as by attaching the pipe 21 to a well-known aspirator to allow the exhaust from the engine to create a vacuum force to draw off the dust or the like from the bin 15, or by positive pressure such as by coupling the bin 15 to the intake manifold of a turbocharged engine or to the air box of a normally aspirated engine to cause air from the engine to blow the dust or the like from the bin 15. The bin 15 may have a first aperture 15' (FIG. 2) for allowing pressurized air to be introduced thereinto and may have a second aperture 15" (FIG. 2) for allowing the pressurized air thus introduced into the bin 15 to exit therefrom in such a manner so as to expel any dust or other particulate matter contained within the bin 15 through the second aperture 15". More specifically, a line, hose, pipe or the like from a source of positive pressure such as the intake manifold of a turbocharged engine or the air box of a normally aspirated engine may be coupled to the first aperture 15' and the pipe 21 may be coupled to the second aperture 15". Such a two-stage filter is manufactured by the Farr Company of El Segundo, California and is known to those skilled in the art as the "Rotopamic Pre-Cleaner with positive pressure bleed."

The improvement of the present invention consists of connecting the exhaust port 23 of a quick release valve 25 of a pressurized air brake system to the bin 15 for allowing any air expelled from the release valve 25 to pass through the bin 15 to thereby expel any dust or the like contained within the bin 15 therefrom through the pipe 21. More specifically, the present invention includes means such as a pipe 27 for coupling the exhaust port 23 of the pressurized air brake system to the first aperture 15' of the bin 15.

The pressurized air brake system is preferably of the well-known type operated by a foot control means 29 which allows air pressure to pass from one or more air tanks 30 or the like to a quick release valve 25 which allows the pressurized air to pass to the brake actuator chambers 31 of one or more wheels W (FIG. 1) to thereby prevent or slow the rotation of the wheels W in a manner apparent to those skilled in the art, and for exhausting through an exhaust port 23 the compressed air used to actuate the brake actuator chambers 31 when the foot control means 29 is deactivated. A compressor 32 and a governor 33 (FIG. 2) may be associated with the air tanks 30 to provide compressed, pressurized air thereto as will be apparent to those skilled in the art. In this type brake system, air normally travels from its source (i.e., the tanks 30) to the brake actuator chambers 31 through the valve 25 as the foot pedal of the control means 29 is depressed. When the foot pedal is released, the valve 25 senses the pressure drop and allows the air in the chambers 31 to vent to the atmosphere through the exhaust port 23.

The present invention may also include means such as the venturi 35 (FIG. 2) for causing the pressurized air being directed through the bin 15 to increase in velocity as it passes through the bin to thereby create a low pressure area within the bin 15 to pull dust or the like from the separator means 13 in a manner which should now be apparent to those skilled in the art.

The present invention may also include means for controlling the flow volume of pressurized air to the bin 15. More specifically, the present invention may include an orificed fitting 37 positioned intermediate the pipe 27 and the exhaust port 23 (FIG. 2) whereby the size of the orifice 39 will act to control the flow volume of pressurized air from the release valve 25 to the bin 15.

As thus constructed, the present invention provides an air cleaner which is especially adapted for use with lift trucks T (FIG. 1) because of the frequent brake applications common to lift truck operation.

Although the invention has been described and illustrated with respect to a preferred embodiment thereof, it is not to be so limited since changes and modifications may be made therein which are within the full intended scope of the invention.

I claim:

1. An improved air cleaner system of the type including separator means for separating particulate material from air before the air passes into the air intake of an internal combustion engine and including a bin for receiving and containing any particulate material so separated, wherein said improvement comprises: means for coupling the exhaust port of a pressurized air brake system to said bin to allow the pressurized air expelled from said brake system when said brake system is activated and subsequently deactivated to pass through said bin and expel any particulate material contained within said bin therefrom.

2. The improvement of claim 1 in which said improvement further comprises: means for controlling the flow volume of said pressurized air being directed through said bin.

3. An air cleaner system for a vehicle including an internal combustion engine having an air intake and including a pressurized air brake system having an exhaust port for expelling pressurized air when said brake system is activated and subsequently deactivated, said air cleaner system comprising:
   (a) separator means for separating particulate material from air passing into said air intake of said engine;
   (b) bin means for receiving and containing particulate material separated from air passing into said air intake of said engine; and
   (c) means for coupling said exhaust port and said bin means for allowing the pressurized air expelled from said exhaust port to pass through and expel particulate material from said bin means.

4. The air cleaner system of claim 3 in which is included means for controlling the flow volume of the pressurized air passing through said bin means.

5. An improved lift truck vehicle of the type including an internal combustion engine, including an air cleaner system having a centrifugal separator for separating dust from any air passing therethrough before that air passes to the air intake of said engine and having a dust bin for receiving and containing any dust thus separated, said dust bin having a first aperture for allowing pressurized air to be introduced thereinto and having a second aperture for allowing said pressured air thus introduced into said dust bin to exit said dust bin in such a manner so as to expel any dust contained within said dust bin through said second aperture, and including a pressurized air brake system having a release valve with an exhaust port for expelling pressurized air when said brake system is activated and subsequently deactivated, wherein said improvement comprises: means connecting said exhaust port of said release valve of said brake system and said first aperture of said dust bin of said air cleaner system for allowing any air expelled from said release valve to pass through said dust bin to thereby expel any dust contained within said dust bin through said second aperture of said dust bin.

6. The improvement of claim 5 in which said improvement further comprises: means controlling the flow volume of air entering said dust bin through said first aperture.

7. An improved lift truck vehicle of the type including an internal combustion engine, including an air cleaner system having a centrifugal separator for separating dust from any air passing therethrough before that air passes to the air intake of said engine and having a dust bin for receiving and containing any dust thus separated, said dust bin having a first aperture for allowing pressurized air to be introduced thereinto and having a second aperture for allowing said pressured air thus introduced into said dust bin to exit said dust bin in such a manner so as to expel any dust contained within said dust bin through said second aperture, and including a pressurized air brake system having a release valve with an exhaust port for expelling pressurized air when said brake system is activated and subsequently deactivated, wherein said improvement comprises: connecting said exhaust port of said release valve of said brake system and said first aperture of said dust bin of said air cleaner system for allowing any air expelled from said release valve to pass through said dust bin to thereby expel any dust contained within said dust bin through said second aperture of said dust bin.

8. The improved lift truck vehicle of claim 7 in which said improvement further comprises: providing means for controlling the flow velocity of any air passing through said first aperture of said dust bin.

9. An air cleaner system for use on a vehicle including a pressurized air brake system having a quick release valve with an exhaust port for expelling pressurized air when said brake system has been activated and subsequently deactivated, said air cleaner system comprising:
   (a) a centrifugal separator for separating dust from any air passing therethrough;
   (b) a dust bin operatively coupled to said centrifugal separator for receiving and containing any dust separated by said centrifugal separator, said dust bin having first and second apertures; and
   (c) pipe means for connecting said exhaust port of said quick release valve of said brake system and said first aperture of said dust bin for allowing any air expelled through said exhaust port of said quick release valve of said brake system to be introduced into said dust bin through said first aperture of said dust bin and subsequently expelled from said dust bin through said second aperture of said dust bin in such a manner so as to expel any dust contained within said dust bin through said second aperture of said dust bin.

10. The air cleaner system of claim 9 in which is included control means for controlling the flow velocity of any air entering said dust bin through said first aperture, said control means including an orificed fitting positioned intermediate said exhaust port and said pipe means.

* * * * *